United States Patent
Gauron (10) Patent No.: US 11,078,949 B2
(45) Date of Patent: Aug. 3, 2021

(54) FLOATING NUT PLATE

(71) Applicant: Jacques Gauron, Issaquah, WA (US)

(72) Inventor: Jacques Gauron, Issaquah, WA (US)

(73) Assignee: Marketing Masters, Inc., Issaquah, WA (US)

( * ) Notice: Subject to any disclaimer, the term of this patent is extended or adjusted under 35 U.S.C. 154(b) by 283 days.

(21) Appl. No.: 16/270,496

(22) Filed: Feb. 7, 2019

(65) Prior Publication Data
US 2019/0316624 A1    Oct. 17, 2019

Related U.S. Application Data

(60) Provisional application No. 62/656,001, filed on Apr. 11, 2018.

(51) Int. Cl.
| | | |
|---|---|---|
| *F16B 37/04* | (2006.01) | |
| *F16B 37/06* | (2006.01) | |
| *B64F 5/00* | (2017.01) | |
| *F16B 5/02* | (2006.01) | |

(52) U.S. Cl.
CPC .......... *F16B 37/044* (2013.01); *F16B 37/064* (2013.01); *B64F 5/00* (2013.01); *F16B 5/025* (2013.01); *F16B 37/04* (2013.01)

(58) Field of Classification Search
CPC ...... F16B 5/025; F16B 37/041; F16B 37/044; F16B 37/045; F16B 37/062; F16B 37/064; F16B 37/065; F16B 37/122; F16B 37/04; Y10S 411/969; Y10S 411/97; B64F 5/00
USPC .......................... 411/111, 112, 113, 178, 190
See application file for complete search history.

(56) References Cited

U.S. PATENT DOCUMENTS

| | | | | | |
|---|---|---|---|---|---|
| 2,409,209 | A | * | 10/1946 | Johnson | F16B 37/044 411/111 |
| 3,219,086 | A | * | 11/1965 | Zahodiakin | F16B 37/044 411/112 |
| 7,114,900 | B2 | * | 10/2006 | Toosky | B21K 25/00 411/108 |
| 7,575,404 | B2 | * | 8/2009 | Toosky | F16B 17/006 411/113 |
| 7,698,798 | B2 | * | 4/2010 | Toosky | B23P 9/025 29/523 |
| 7,802,952 | B2 | * | 9/2010 | Toosky | F16B 37/062 411/113 |
| 7,823,262 | B2 | * | 11/2010 | Toosky | F16B 37/062 29/402.03 |
| 8,353,649 | B2 | * | 1/2013 | Csik | F16B 39/284 411/111 |
| 9,435,369 | B2 | * | 9/2016 | Deck | F16B 37/043 |

(Continued)

*Primary Examiner* — Roberta S Delisle
(74) *Attorney, Agent, or Firm* — Williams Kastner & Gibbs PLLC; Mark Lawrence Lorbiecki (57) ABSTRACT

The inventive nut plate fastener includes a nut plate base comprising a flat elongated base plate. The base plate has each of a first and a second planar base face arranged parallel to each other. A cylindrical plate bore diameter is selected to be greater than the diameter of the threaded hole but lesser than the diameter of the nut body. A nut cage holds the nut in contact with the nut flange face such that the threaded hole and the plate bore rest in substantial coaxially alignment. The nut cage includes a first and a second nut cage bridge oriented about the plate bore in opposed symmetric relationship. Each bridge includes a center post positioned to engage the respective nut tang notch.

15 Claims, 7 Drawing Sheets

(56) References Cited

U.S. PATENT DOCUMENTS

| | | | |
|---|---|---|---|
| 10,502,254 B2* | 12/2019 | Dufour | B33Y 80/00 |
| 2009/0103997 A1* | 4/2009 | Csik | F16B 39/284 |
| | | | 411/112 |
| 2016/0091011 A1* | 3/2016 | Deck | F16B 37/043 |
| | | | 411/112 |

* cited by examiner

FLOATING NUT PLATE

PRIORITY CLAIM

This nonprovisional application claims priority to the filing of the provisional application dated 11 Apr. 2018 and having Ser. No. 62/656,001, entitled "Fastener Nut Plate" recognizing the inventor, Jacques Gauron, that application being incorporated in its entirety by this reference.

FIELD OF THE INVENTION

The fastener nut plate disclosed herein resides in the field of fasteners, specifically fasteners relying upon a captured nut.

BACKGROUND OF THE INVENTION

U.S. Pat. No. 6,474,917 issued to Gauron on Nov. 5, 2002, discloses an example of what is commonly known in the aircraft industry as a "clip nut." The Gauron clip nut is made with a plastic clip-body that retains a metal fastener nut. The clip nut is formed of thermoplastically of a "polyamide-imide" (or "PAI") polymer that is identifiable in the industry bearing the registered trademark "Torlon®." PAI Polyamide-imides (PAIs) have been commercially available for several decades. Their superior mechanical, thermal and oxidative properties have made PAI suitable for fastening in an aerospace environment because of their thermal stability and chemical inertness.

Although PAI is an amorphous thermoplastic, it requires a post cure after application to surfaces in order to increase its molecular weight, which increases the chemical and thermal stabilities of PAI. Upon curing, PAI is extremely durable such that the chemical degradation of PAI matrix can be created only by hot steam and high pH. The PAI's compressive strength and its impact strength are higher even when compared to other high-performance polymers.

Torlon® polyamide-imide (PAI) resins can only be shaped under a unique set of conditions and using injection molding equipment that is specific to this material. To produce high-quality components, specific equipment considerations and processing procedures must be followed. Modern reciprocating screw injection molding machines with microprocessor controls capable of closed loop control are recommended for molding Torlon® PAI resin. But, to get a durable part, the injection molded part must be properly cured after injection molding.

Because Torlon® PAI is a reactive polymer, the polymer will increase in molecular weight through a process of chain extension, branching and cross-linking when heated. This type of plastic is injection molded to the desired design or shape and then "cured." The post cure process involves placing molded parts in a forced air oven and thermally treating them using a series of increasing temperatures for varying times. The curing process results in the plastic being altered from a brittle and less-flexible material to a tough but more-flexible material that has the capability to provide strength that is comparable to metal across a wide temperature range.

PAIs have been developed as an alternative material to polyimides and polyamides to keep the balance of thermal stability with good processability. PAIs combine the superior mechanical properties associated with the amide group, and the high thermal stability of the imide ring in the same material, thus making the material even stronger than resins drawn from the amide group. In addition, the synthetic route to PAIs offers the possibility of incorporating specific functionalities between the amide and imide groups. The PAI polymer exhibits very high strength, stiffness, creep resistance and displayed good performances at moderately high temperatures. As this plastic has been successfully exploited in the Gauron clip nut, the current invention also seeks to exploit those properties and the presently preferred embodiment is formed of a PAI polymer.

A plate nut, also known as a nut plate, anchor nut or anchor plate, in its conventional form is a stamped sheet metal nut that is usually riveted to a workpiece to provide a threaded nut to engage a bolt which, when torqued down, the nut and bolt will hold the workpiece fixed within a larger structure. The most popular version is characterized by two lugs joined to a base configured to capture a floating anchor nut. The described configuration allows the captured nut to move slightly in directions parallel to the surface of the workpiece and so enlarges the positioning tolerances of the mounted parts. Nut plates were originally developed for the aerospace industry but are now also commonly used in automotive racing, ship and boat building, and fabrication of computer server cabinetry.

The rivets used to affix a nut plate to a workpiece are not load bearing. The rivets together hold a base against the workpiece. The base includes a metal cage that captures the nut prevents its rotation to assure positive positioning of the mating bolt and because of that the plate nuts are self-wrenching. The captured nut on the riveted base is, likewise, held in alignment with a hole in the workpiece to accommodate a bolt to engage that nut. Once the bolt is torqued into the captive nut, the two, in concert, hold that workpiece as would any nut and bolt. Plate nuts are preferred for stressed-skin applications because they do not introduce additional stresses around the bolt hole.

Riveting is the manner most commonly used to attach plate nuts to the workpiece. A rivet can, however, upon upsetting (fixing the rivet in place) exert a great deal of compressive force on the plate nut base. Before upsetting, a rivet consists of a smooth cylindrical shaft terminating a head on one end. The end opposite to the head is called the tail. On installation, the rivet is placed in a punched or drilled hole, and the tail is upset, or bucked (i.e., deformed), so that the tail expands to about 1.4 times the original shaft diameter, thereby forming a flange holding the rivet in place. Put another way, riveting includes a squeezing of the rivet along its axis thereby causing large plastic deformations to form the driven rivet head. However, excessive squeezing induces the excessive stress concentration in the nut plate's base plate. Such stress concentration often results in initial cracks extending from walls of the hole into the workpiece. In the same manner, an excess of compressive force results in improper rivet head deformation leading to a loose contact between the rivet and workpiece which requires replacement.

The above-described "nut plate" fastener design has been in use in the aircraft industry for a long time. Nut plates facilitate blind-side fastening; blind fasteners are ideal when access from only one side of the joint material is available. By exploiting this ability to fasten a plate from one-side, designers can build out interiors of wings and fuselages without compromising aerodynamic and structural properties of the airframe.

As typical in the aerospace industry, nut plates are used to fasten flat panels such as inspection panels to structural bulkheads. Thus, in practice, nut plates are riveted to a structural bulkhead as fastening points for the inspection panel. An inspection panel with predrilled holes can then be fastened by bolts passing through those holes and, there, engaging the nuts held within the nut plates to the bulkhead. The bolts and nuts then fix the plate in place.

The selection of materials in a conventional nut plate is dictated by the need to assure the self-wrenching ability of the captured nut, thereby allowing installation of panels even when only one side of the ultimate assembly is accessible. To assure this self-wrenching ability, steel is often used to form the base plate of a nut plate. Steel is selected as it is more capable of imparting the necessary torque necessary to advance the bolt down the threads of the captured nut. In conventional applications, however, such a bolted metal construction might suffer by being susceptible to corrosion. The specific type of corrosion occurs where a different type of metal or metal alloy is affixed to or fastened against a first metal.

When a steel base plate contacts an aluminum workpiece skin, that contact may be a site for galvanic corrosion. Galvanic corrosion (also called "dissimilar metal corrosion" or wrongly "electrolysis") refers to corrosion damage induced when two dissimilar materials are coupled in the presence of a corrosive electrolyte. An electrochemical attack may be likened chemically to the electrolytic reaction that takes place in electroplating, anodizing, or in a dry cell battery. The reaction in this corrosive attack requires a medium, usually water, which is capable of conducting a tiny current of electricity. When a metal meets a corrosive agent and is also connected by a liquid or gaseous path through which electrons may flow, corrosion begins as the metal decays by oxidation.

During the attack, the quantity of corrosive agent is reduced and, if not renewed or removed, may completely react with the metal, becoming neutralized. Different areas of the same metal surface have varying levels of electrical potential and, if connected by a conductor, such as salt water, will set up a series of corrosion cells facilitating that corrosion.

All metals and alloys are electrically active and have a specific electrical potential in a given chemical environment. This potential is commonly referred to as the metal's "nobility." The less noble a metal is, the more easily it can be corroded. The metals chosen for use in aircraft structures are a studied compromise with strength, weight, corrosion resistance, workability, and cost balanced against the structure's needs. The strongest aluminum alloys are less corrosion resistant due to galvanic reactions with alloyed copper. For that reason, to the greatest extent possible, metal fasteners are either selected to match the metal composition of the structure or metal on metal contact is avoided using non-conductive materials to electrically isolate the fastener. Nonetheless, electrochemical attack is responsible for most forms of corrosion on aircraft structure and component parts.

For example, in November 2008, Boeing Commercial Airplanes, a business unit of The Boeing Company delayed the delivery of 737 jetliners due to nut plates that lacked a required anticorrosion coating. Boeing was notified about the problem by a Wichita, Kans., company that builds wing and fuselage components for nearly every Boeing commercial aircraft, Spirit AeroSystems Inc. To comply with US Federal Aviation Administration standards, each of the errant nutplates were replaced. Each Boeing 737 uses between 3,000 and 5,000 nutplates. Boeing removed approximately 20,000 nutplates that had been installed in airplanes that had not yet been delivered to customers. Additionally, About 30%/o of the nutplates need to be replaced on nearly four hundred 737s delivered after August 2007. *Spirit Aerosystems, Inc. v. SPS Techs., LLC*, No. 09-CV-1144-EFM-KGG, 2013 U.S. Dist. LEXIS 168696, at *6-7 (D. Kan. Nov. 27, 2013). The need for a nut plate configured to hold the nut and bolt of the nut plate in electrical isolation from the workpiece is demonstrated by evidence presented in this lawsuit.

As the need to rivet these floating nut plates to workpieces such as fairing panels and decking dictates, stress on the base plate of the nut plate necessitates a highly durable material capable of imparting sufficient torque on the captured nut. Because the metal-on-metal contact can possibly create maintenance issues, there has been a long-felt need to develop a design for a floating nut plate having a non-metal base.

As stated in the background, the PAI polymer exhibits very high strength, stiffness, creep resistance and displayed good performances at moderately high temperatures. PAI resins were originally designed for electromagnetic wire coatings and exhibits the qualities of a good insulator. Despite these benefits, however, PAI resin, even at its proper melt temperature exhibits poor flow properties, rendering it difficult to injection mold. Typically, as the PAI resin fills the mold, where the resin meets resin, a knit line forms. Such a knit line is a structural weakness in the finished part. Engineering a PAI base plate and nut to form a floating nut plate to electrically isolate the metal and fastener is a rigorous task and the design features necessary to produce a durable nut plate are not apparent to one having ordinary skill in the art. Also, because of their high price, PAI resins are usually only used when their outstanding properties are required.

Figure 12:
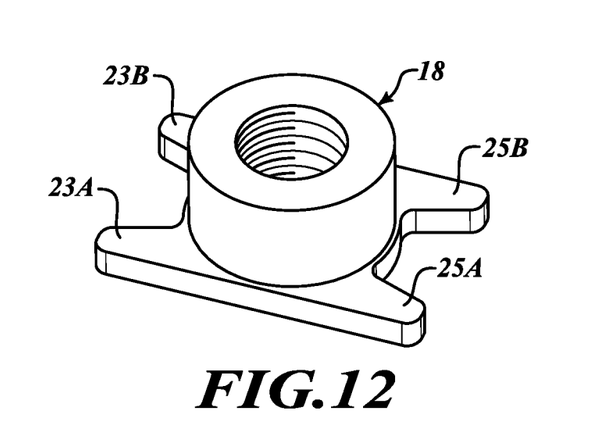
FIG. 12 is a pictorial view of the metal nut, shown alone and apart from the plastic base.

With reference to FIGS. 1-12 but especially FIG. 12, a description of the captive nut is appropriate. The inventive nut plate fastener includes a nut 18 having a generally cylindrical nut body oriented about a central axis. The nut 18 is formed of a steel alloy for strength. The nut body defines a generally cylindrical threaded hole oriented about the central axis. The diameter of the nut body is greater than the diameter of the threaded hole. The nut body extends between a first planar face and a second planar face. Each of the first and second planar faces are oriented perpendicularly to central axis and parallel to each other.

The nut has a nut flange including each of a first, second, third, and fourth nut tang. Each nut tang extends along the first planar face to form the flange such that, in concert with the first planar face, each of the first 23A, second 23B, third 25A, and fourth 25B nut tangs is oriented to define one of four corners of a generally rectangular nut flange face. The nut flange face defines a longitudinal axis passing through the central axis at a point of intersection. The longitudinal axis is perpendicular to the central axis. Additionally, a latitudinal axis passes through the central axis and the longitudinal axis at the point of intersection. The latitudinal axis is perpendicular to each of the central axis and longitudinal axis.

The first 23A and third 25A tangs extend to define a first nut flange edge parallel to and offset from the longitudinal axis by an edge offset distance. Similarly, the second 23B and fourth 25B tangs extend to define a second nut flange edge in opposed relation to and parallel to the first nut flange edge, being offset from the longitudinal axis by the offset distance. The first 23A and second 23B nut tangs are symmetrically disposed relative to the longitudinal axis. Together, the first 23A and second 23B define a first nut tang notch centered on the longitudinal axis. Again, in a similar manner, the third 25A and fourth 25B nut tangs are symmetrically disposed relative to the longitudinal axis and define a second nut tang notch centered on the longitudinal axis.

The nut plate fastener also includes a nut plate base 12 comprising a flat elongated base plate 14. The base plate 44 has each of a first 14 and a second planar base face 38. The first 14 and second planar base 38 faces are parallel to each other. The base plate 44 defines a cylindrical plate bore 37 having a bore axis and a bore diameter. The bore diameter is selected to be greater than the diameter of the threaded hole but lesser than the diameter of the nut body. The first planar base face 14 also includes a nut cage 16 to hold the nut in contact with the nut flange face such that the threaded hole and the plate bore rest in substantial coaxially alignment; thereby to allow a bolt to pass through the plate bore to engage threads within the threaded hole. The nut cage 16 is made up of a first 20 and a second nut cage bridge 22. The first 20 and second nut cage bridges 22 are oriented about the plate bore 37 in opposed symmetric relationship. The first nut cage bridge 20 rests on a first center post 34 and the second nut cage bridge 22 rests on a second center post 32. The first center post 34 is positioned to engage the first nut tang notch and the second center post 32 is positioned to engage the second nut tang notch such that the two nut cage bridges 20, 22 capture the nut 18 in sliding engagement with the first planar base face 14 allowing even a misaligned bolt to pass through the base plate and engage the helical threads of the nut 18 in a manner common to all threaded fasteners.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Boeing, the Aerospace Industry Association, and various aircraft manufacturers have each published specifications defining "a nut with a flanged base of varied shapes which may be plain or mounted by rivets, bolts, welding or integral prongs; an integral feature is incorporated for locking on the threads of a mating member." Such is the working definition for a fastener this application will refer to as a "floating nut plate" or in abbreviated form, a "nut plate" or "nutplate." While strict adherence to any of these standards is not a necessary nor even a possible goal of this inventive design, it is the intent of the inventor to explain an alternative design sufficient to meet the engineering requirements of the nut plates specified by these entities while not being in entire conformity. Advantageously, the makeup of the baseplate disclosed herein is electrically nonconductive and will not facilitate galvanic corrosion.

The inventive nut plate 10 is depicted in each of the figures herein and wherever reference is made thereto, each reference number shall refer to the same structure in any figure where that number is set forth. The inventive nut plate fastener 10 includes a nut 18 having a generally cylindrical nut body oriented about a central axis. The nut body defines a generally cylindrical threaded hole oriented about the central axis. The diameter of the nut body is greater than the diameter of the threaded hole. The nut body extends between a first planar face and a second planar face. Each of the first and second planar faces are oriented perpendicularly to central axis and parallel to each other.

The nut has a nut flange including each of a first, second, third, and fourth nut tang (reference numbers 23A, 23B, 25A and 25B respectively). Each nut tang 23A, 23B, 25A and 25B extends along the first planar face to form the flange such that, in concert with the first planar face, each of the first, second, third, and fourth nut tangs 23A, 23B, 25A and 25B is oriented to define one of four corners of a generally rectangular nut flange face. The nut flange face defines a longitudinal axis passing through the central axis at a point of intersection. The longitudinal axis is perpendicular to the central axis. Additionally, a latitudinal axis passes through the central axis and the longitudinal axis at the point of intersection. The latitudinal axis is perpendicular to each of the central axis and longitudinal axis. The nut flange face is symmetric about either of the longitudinal axis and the latitudinal axis.

The first and third tangs 23A, 25A extend to define a first nut flange edge parallel to and offset from the longitudinal axis by an edge offset distance. Similarly, the second and fourth tangs 23B, 25B extend to define a second nut flange edge in opposed relation to and parallel to the first nut flange edge. The second nut flange edge is also offset from the longitudinal axis by the offset distance. The first and second nut tangs 23A, 23B are symmetrically disposed relative to the longitudinal axis. Together, the first and second nut tangs 23A, 23B define a first nut tang notch centered on the longitudinal axis. Again, in a similar manner, the third and fourth nut tangs 25A, 25B are symmetrically disposed relative to the longitudinal axis and define a second nut tang notch centered on the longitudinal axis.

The nut plate fastener 10 also includes a nut plate base 12 comprising a flat elongated base plate 44. The base plate 44 has each of a first and a second planar base face 14, 38 respectively. The first and second planar base faces 14, 38 are parallel to each other. The base plate defines a cylindrical plate bore 37 extending between the first and second planar base faces 14, 38 having a bore axis and a bore diameter. The bore diameter is selected to be greater than the diameter of the threaded hole but lesser than the diameter of the nut body. The first planar base face 14 also includes a nut cage 16 to hold the nut 18 in contact with the nut flange face such that the threaded hole and the plate bore 37 rest in substantial coaxially alignment; thereby to allow a bolt to pass through the plate bore 37 to engage threads within the threaded hole. The nut cage 16 is made up of a first and a second nut cage bridge 20, 22. The first and second nut cage bridges 20, 22 are oriented about the plate bore in opposed symmetric relationship. The first nut cage bridge 20 rests on a first center post 34 and the second nut cage bridge 22 rests on a second center post 32. The first center post 34 is positioned to engage the first nut tang notch and the second center post 32 is positioned to engage the second nut tang notch such that the two nut cage bridges 20,22 capture the nut in sliding engagement with the first planar base face 14 allowing even a misaligned bolt to pass through the base plate bore 37 and engage the helical threads of the nut in a manner common to all threaded fasteners.

In the preferred embodiment of the invention, the nut 18 is formed of metal preferable a steel alloy, while the nut plate base 12 is formed of polyamide-imide resin or "PAI". In the preferred embodiment the nut plate base 12 is formed of resin marketed under the registered trade name "Torlon®." Any reference herein to Torlon® however, is not meant to limit the invention as the nonconductivity necessary for the base plate 12 is found in all PAI products and therefore any reference thereto applies with equal vigor to a base plate 12 formed of any other PAI resin product.

Torlon® and all other polyamide-imide (PAI) resins require formation under a unique set of conditions and certain aspects of the injection molding equipment which are specific to this material. PAI offers excellent compressive strength while providing electrical insulation between the nut 18 and any dissimilar metallic work piece to which the nut plate fastener is joined. PAI also imparts exceptional impact strength to the base plate 12 allowing it to resist cracking when subjected to rivet bucking forces. Because PAI is a reactive polymer, however, to achieve this strength, the polymer must be subjected to curing which increases its molecular weight by means of processes known as chain extension, branching and cross-linking. This will be described in greater detail below.

The nut plate fastener 10 includes a base 12 that is generally a flat elongated plate onto which is formed a nut cage 16 that is generally indicated herein by reference numeral 16. Together the base plate 12 with its nut cage 16, in the presently preferred embodiment are integrated and formed as a single piece of injection-molded PAI plastic. As such, the process of forming the nut plate fastener can be completed in three steps, i.e. form the base plate 12, form the nut 18, capture the nut in the cage 16 of the base plate to assemble.

As mentioned above, parts that are injection molded from PAI must undergo a thermal process known as post-cure. Uncured or inadequately cured parts will not perform at the expected levels. The post cure process involves placing molded parts in a forced air oven and thermally treating them using a series of increasing temperatures for varying times.

Figure 1:
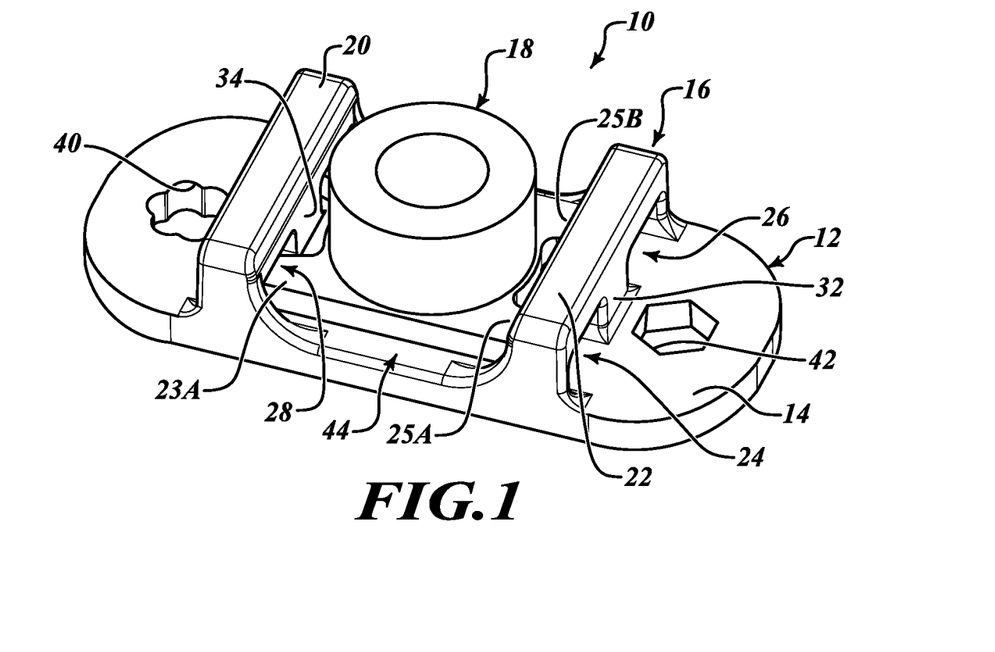
FIG. 1 is a pictorial view of a nut plate fastener design that shows a metal nut retained by a non-metal or plastic base, with the plastic base being made from a PAI polymer.
Figure 2:
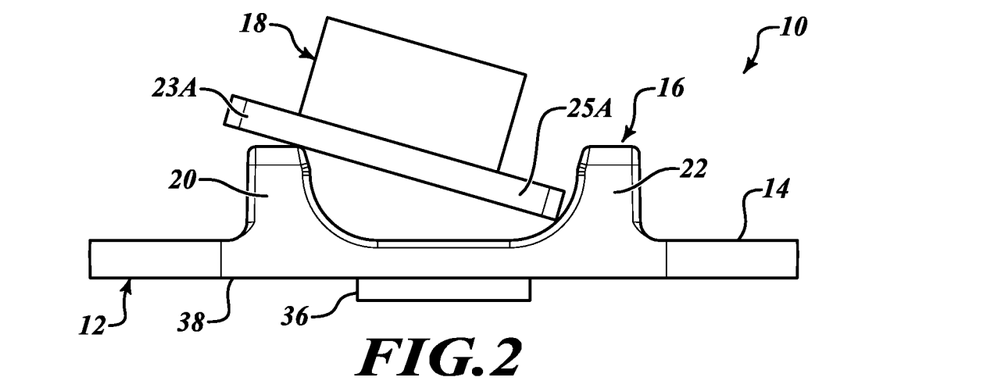
FIG. 2 is a side view of the nut plate fastener shown in FIG. 1, and is the first of a series of three views that illustrates how a metal nut is installed in and on the plastic base.
Figure 3:
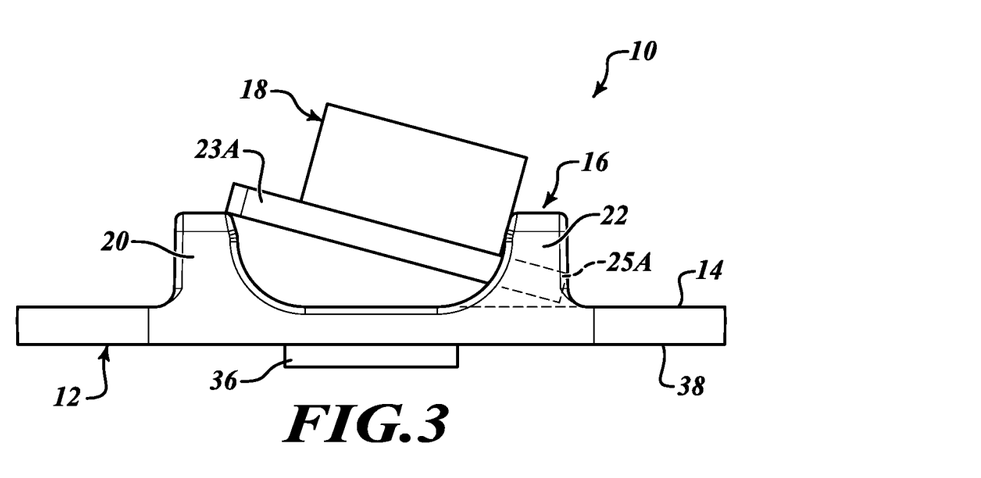
FIG. 3 is a side view like FIG. 2, but is the second in a series of three views.
Figure 4:
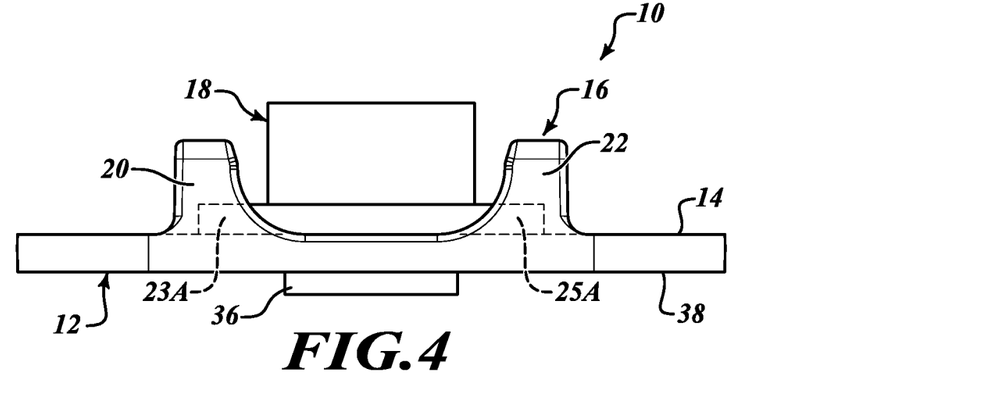
FIG. 4 is a side view like FIG. 2, but is the third in a series of three views.

PAI is a very unusual plastic resin. Generally, plastics are of two natures, thermoplastic and thermoset. Thermoplastics can be melted and reshaped over and over again, in the same manner as candle wax. Thermosetting plastics, on the other hand, can only be heated and shaped once. Items made from thermoplastics can easily deform when they are exposed to heat, while those that are made of thermosetting plastics cannot. Polyamide-imides are either thermosetting or thermoplastic and convert from thermoplastic to thermoset based upon curing. While in its pre-cured state, PAI is brittle and cannot be flexed significantly without breaking, after curing, the PAI becomes tough and strong but also enjoys a greater level of flexibility. For example, once cured, the base 12 can be bent sufficiently during assembly to allow insertion of the metal nut 18 as is illustrated in the drawings, esp. FIGS. 2, 3 and 4.

By way of nonlimiting exemplary process, injection molding melt temperatures for PAI resins are generally held at about 355° C., for injection into molds having temperatures maintained at about 230° C. Once the injected resin cools, the PAI formed parts are thermoplastic and the sprue used to fill the mold and the runners used to distribute the resin are separated from the product or part (in this case, the base 12) at the gates and can then be remelted for injection, again, into the mold to form more parts. As stated above however, the base 12 so molded, is, at this point, a very fragile and brittle part. Curing must occur to make the part usable and that curing will convert the thermoplastic part into a thermoset part.

In order to increase the molecular weight of the resin in the base 12 (by cross-linking and cross-branching described above), prolonged annealing cycles (alternately referred to herein as curing) are required. For example, for a nut plate base 12 select to have a 12 mm thick plate might be cured in an annealing cycle subjecting the base 12 to the following temperatures and intervals: 36 hours at 150° C., 36 hours at 177° C., 36 hours at 204° C., 36 hours at 232° C. and finally 48 hours at 260° C., a total time of 192 hours. For a 6 mm section the total recommended time is 120 hours and for a 3 mm section, 48 hours. Given the necessity of this annealing cycle in production, this nut plate base can generally be formed only with specialized production lines and by technicians with specialized knowledge of PAI resins.

Referring now to FIG. 2, insertion of the metal nut into the nut cage 16 will now be described. As can be seen in the drawings, the nut cage has two nut cage bridges 20, 22 that capture tangs 23A, 23B, 25A, 25B, on the nut 18 (the nut 18 is illustrated as a separate part in FIG. 12). FIG. 12 provides a better view of the nut tangs 23A, 23B, 25A, 25B) Two of the nut tangs 25A, 25B are inserted into side openings 24, 26 the second nut cage bridge 22 defines (see, e.g., FIG. 1), as shown in FIG. 3. At that point, the nut 18 can be pressed down into engagement with the base plate 12. The first nut cage bridge 20, along with the second nut cage bridge 22, will flex outwardly sufficiently to allow the nut tangs 23A, 23B on the opposite side of the nut 18 to snap into place in similar side openings 28, 30 the first nut cage bridge 20 making up the other side of the nut cage 16 (see FIG. 4).

Figure 5:
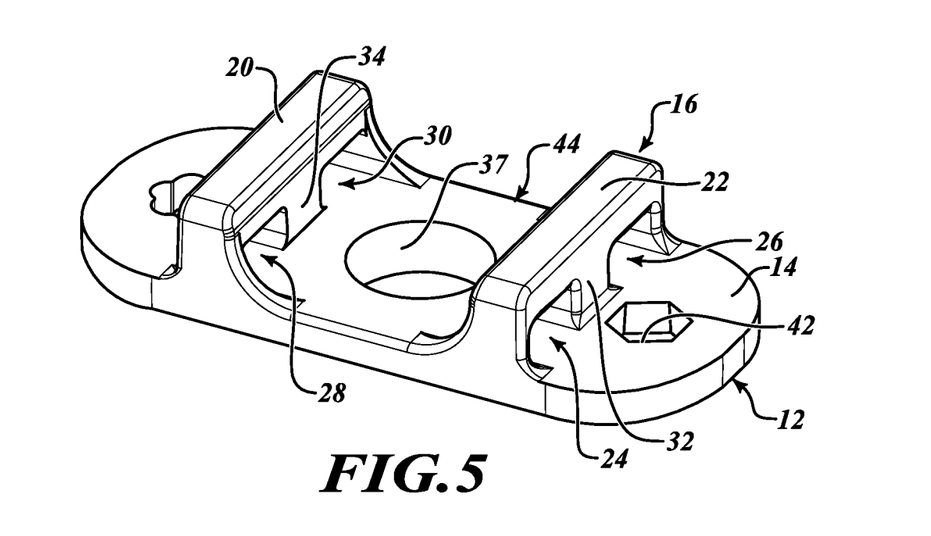
FIG. 5 is a pictorial view of the plastic base shown in FIG. 1, but with the metal nut removed.
Figure 6:
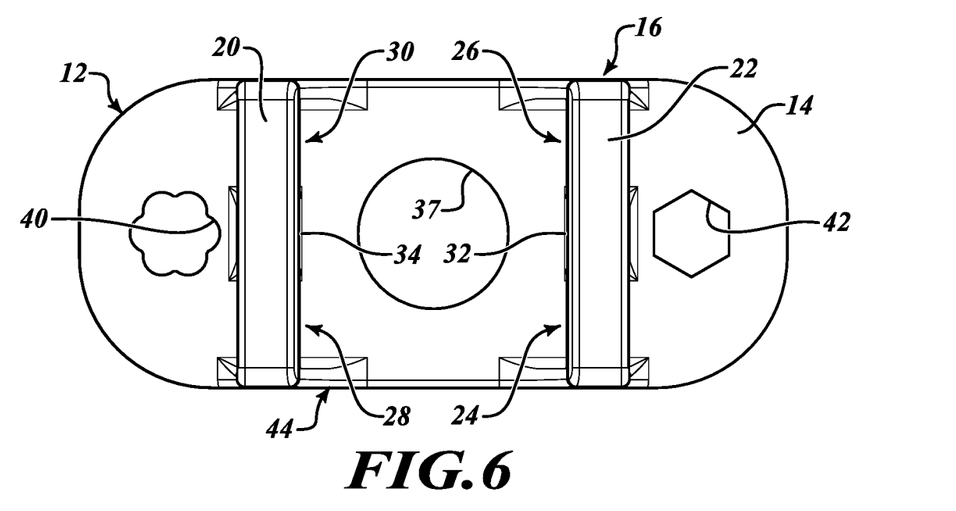
FIG. 6 is a top view of the plastic base shown in FIG. 5.
Figure 7:
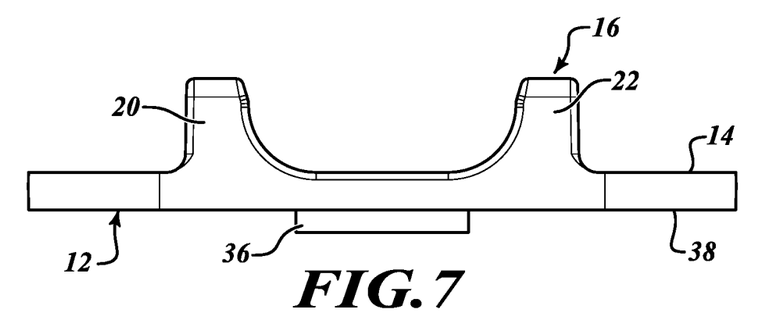
FIG. 7 is a side view of the plastic base shown in FIG. 5.

As is best illustrated in FIG. 5, the capture of the nut 18 within the nut cage 16 relies upon the structure of each of first nut cage bridge 20 and the second nut cage bridge 22 that together make up the nut cage 16. Importantly, each of first nut cage bridge 20 and the second nut cage bridge 22 have a center post 34, 32, respectively. When the nut 18 is snapped into place, in the manner described above, the first center post 32 is positioned between the nut tangs 25A, 25B, while the second center post 34 is, likewise, positioned between tangs 23A, 23B. The center posts 32, 34 not only fix the nut 18 against the first planar face 14, but also are positioned so as to prevent rotation of the nut in response to torque applied when a fastener is threaded into it. Because the center posts 32, 34 are integrated into the base plate 12 as part of the molding process, the center posts 32, 34 provide a strong abutment to prevent rotation of the nut 18 in use.

Visible in FIGS. 2, 3, 4, and 7 illustrate an annular ring 36 present in preferred embodiments of the invention. A first advantage of the annular ring 36 is that because the annular ring 36 is molded as integral to the second planar face 38 of the base 12 to provide further dielectric insulation between the nut 18 and either of a bolt or workpiece. Positioned with a hole in a panel, the annular ring 36 bears upon edges of the hole in the panel. A further purpose of the annular ring 36 is to assist a technician with the placement and installation of the nut plate fastener into the hole in the workpiece. The user will bore such a hole (not shown) into the surface of the workpiece where the fastener 10 is to be attached. The bore is sized to receive the annular ring 36 in loose nesting engagement. The fastener 10 is, then, riveted to the surface of the workpiece (not shown). Rivets are inserted and bucked after being passed through rivet openings 40, 42 (one on each side of the nut cage 16 in the preferred embodiment).

In the drawings provided here, one exemplary rivet opening 40 is illustrated as having a clover leaf design, while another exemplary rivet opening 42 is illustrated as having a hex design. In both cases, a cylindrical rivet would, in installation, be passed through each opening. Though neither configuration is necessary to practice the invention one or the other may prove to be a superior rivet opening shape thereby to contain crack propagation. A round rivet opening remains within the scope of this invention, while either of the four rivet openings 40, 42, shown in FIGS. 5, 6 and 13. The embodiment including the hole 43 (FIG. 13) are presently preferred as preventing crack propagation within the base plate 12.

Importantly, the inventor notes, that while the nut plate 10 will be riveted to a planar workpiece, it is not the rivets that bear the principal task of fixing the fastener in place after a bolt is tightened into the captured nut 18. Rather, the rivets only serve to fix the nut 18 on the opposite side of the workpiece such that, in use, a bolt passes through a panel to be affixed to the workpiece. The task of fastening, on the other hand, is perform by the bolt passing through the workpiece into the nut 18. Turning the nut draws the panel to the workpiece such that the fastening bolt bears the strain and the stress necessary to fix the panel to the workpiece. As the rivets serve only to locate the nut plate 10 on the workpiece, the tightening of the bolt within the nut 18 places no additional stress on the rivets or the boundaries of the rivet holes 40, 42. Thus, while containing crack propagation at the rivet openings 40, 42 is a suitable purpose in forming the rivet openings, doing so is, therefore, not necessary to practice the instant invention. Nonetheless, preferred embodiments include the defining of rivet openings 40, 42, shown in FIG. 4. By doing so, a nut plate so configured will assure that in assembly, an over tensioned rivet will not ruin a partially fixed and mounted nut plate 10, as ruination necessitates the drilling out of the rivets in order to start over.

A stress concentration (often called stress raisers or stress risers) is a location in an object where stress is concentrated. An object is stronger when force is evenly distributed over its area, so a reduction in area, e.g., caused by a crack, results in a localized increase in stress. A material can fail, via a propagating crack, when a concentrated stress exceeds the material's theoretical cohesive strength. The real fracture strength of a material is always lower than the theoretical value because most materials contain small cracks or contaminants (especially foreign particles) that concentrate stress. Fatigue cracks always start at stress raisers, so removing such defects increases the fatigue strength.

It is well known that the internal crack propagation always leads the failure of engineering structure by crossing the critical domain of the structure. Therefore, if the crack doesn't cross the critical domain, the failure will not happen. The localized stresses the rivet imparts to the base 12 may cause the PAI in that neighborhood to undergo plastic deformation. Because the nominal stresses are elastic, an elastic-stress field surrounds the zone of plastically deformed metal in the vicinity of stress concentration. A fatigue crack initiates more rapidly as the magnitude of the local cyclic-plastic deformation increases. That is, when the material in the vicinity of a notch tip is subjected to stress ranges approximately equal to or larger than the yield stress of the material, the plastic deformation causes the material to deform along slip planes that coincide with maximum shear stress, which results in slip steps on the surfaces of the notch. These slip steps act as new stress raisers that become the nucleation sites for fatigue cracks which initiate along the maximum shear planes and propagate normal to the maximum tensile stress component.

An optimum hole shape reduces von Mises stress and von Mises strain at hole edge. The von Mises yield criterion (also known as the maximum distortion energy criterion) suggests that yielding of a ductile material begins when the second deviatoric stress invariant reaches a critical value. It is part of plasticity theory that applies best to ductile materials, such as some metals. Therefore, a controllable crack propagation method to control a crack propagation path employs non-circular edges to the rivet openings 40, 42, in order to prevent crack propagation at the boundary between the rivet and the base 12, so that the critical domain retaining the rivet in the base 12 should not be crossed by the crack and the failure will not happen.

Figure 13:
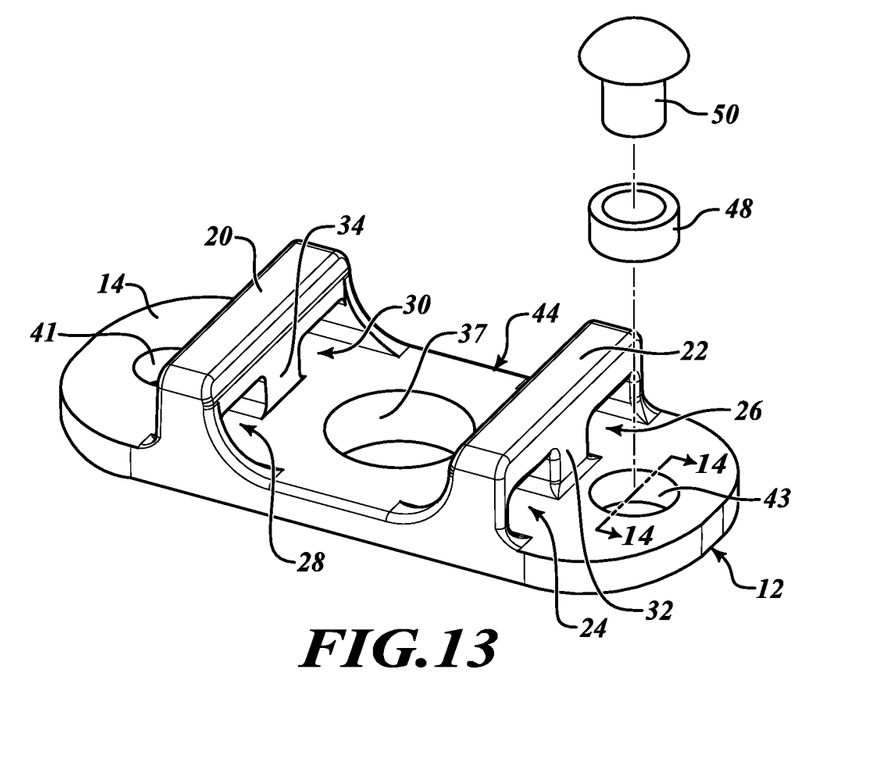
FIG. 13 a pictorial view of the plastic base shown in FIG. 1, but with the metal nut removed.

FIGS. 5 and 13 use illustrations of four distinct embodiments of the nutplate 10. These embodiments only differ as to the shape of the rivet holes. For example, two distinct embodiments are depicted in FIG. 5. The nutplate base 12 defines a rivet hole 40 having six scallop-shaped lobes defined therein results in narrow edges to engage the rivet. Having large diameter scallops allows the nutplate base 12 to spread stresses and strains resulting from compression of the rivet. An alternate embodiment also depicted in FIG. 5 relies upon the straight edges of a hexagonal hole 42 to engage the rivet. Using these alternate forms for rivet holes increases initial fatigue life very close to the rivet hole. Experimentation has shown that these two shapes present more localized contact with the rivet allowing limited cracking, when it occurs and preventing the crack from propagating across the critical domain.

FIG. 13 depicts two further embodiments. In the most common embodiment, a hole 41 is sized to snugly accommodate the rivet. This is a conventional embodiment in that no particular shaping of the hole is exploited to minimize cracking. The hole 41 is sized according to conventional usage such at a rivet having a $\frac{1}{16}$-inch shaft diameter is upset in a hole in the workpiece by a #51 drill having a 0.067-inch diameter; for a rivet with a $\frac{3}{32}$-inch shaft diameter, a #40 drill is used to yield a 0.098-inch diameter hole in the workpiece.

Figure 14:
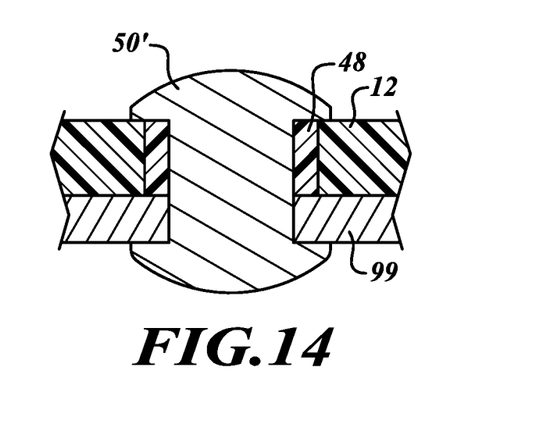
FIG. 14 is a cross-sectional view of an upset rivet, bushing, nut plate base, and workpiece.

In what is the presently preferred embodiment, the nutplate base 12 defines a cylindrical hole 43 sized to have a diameter smaller than that of the head of a rivet 50 but large enough to accommodate the rivet's 50 shaft encircled by a sleeve 48. A sleeve is a bushing of the same metal material from which the rivet 50 is made with an inner diameter sized to engage the rivet 50 at its shaft, an outer diameter to engage the hole 43, and length equal to the width of the nutplate base 12 to completely fill the hole. In use, the sleeve provides structure to the base plate as can be seen in FIG. 14. As is evident, the workpiece 99 underlays the nutplate base 12. The sleeve is inserted into the hole 43 and is supported by the workpiece. The rivet 50' is upset to capture the sleeve 48 in the hole 43 that the base 12 defines. In this manner the sleeve 48 supports the nutplate base 12 against the compressive force the upset rivet 50' exerts on both the workpiece 99 and the base 12. Because of the similarity in metallic makeup, galvanic corrosion does not occur within the hole 43 by interaction between the rivet 50' and the sleeve 48.

Figure 8:
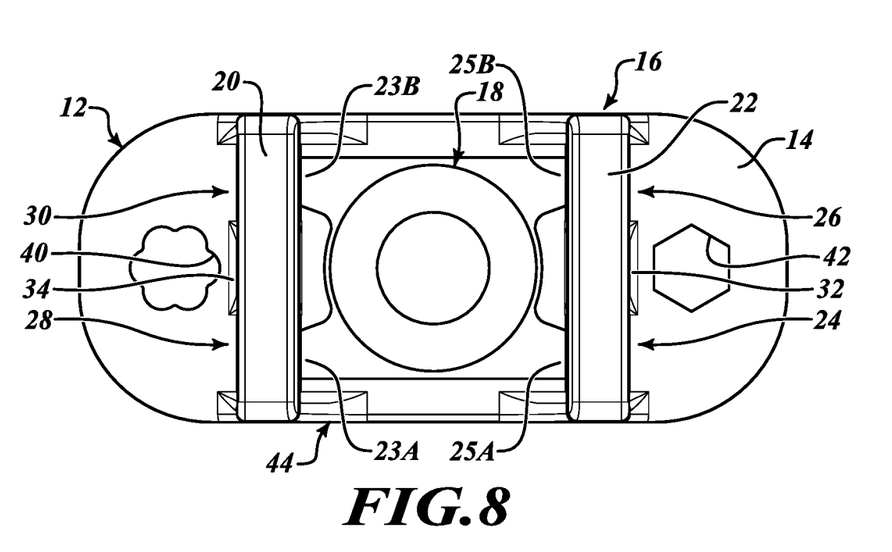
FIG. 8 is a top view of the nut plate fastener design shown in FIG. 1.
Figure 9:
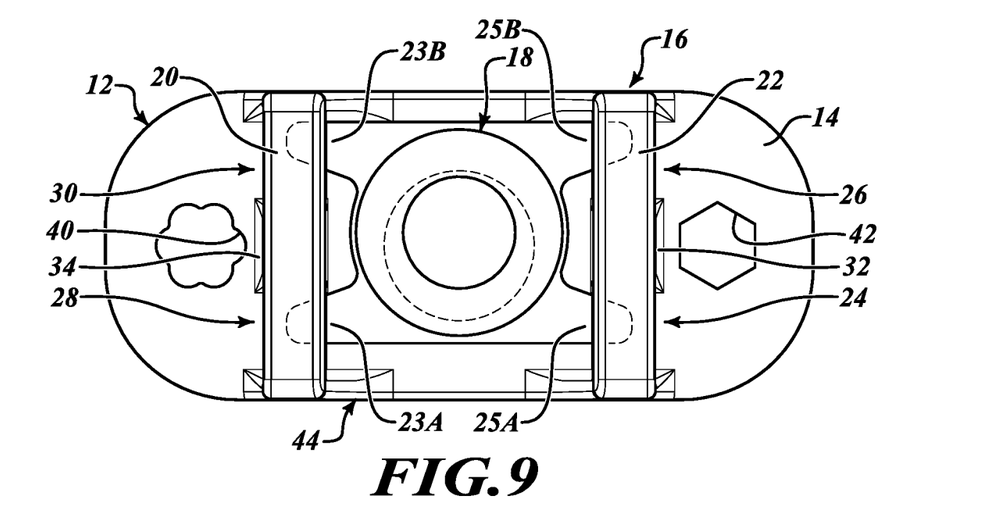
FIG. 9 is a top view similar to FIG. 8, but shows the metal nut translated ("the float") slightly to one side of the plastic base.
Figure 10:
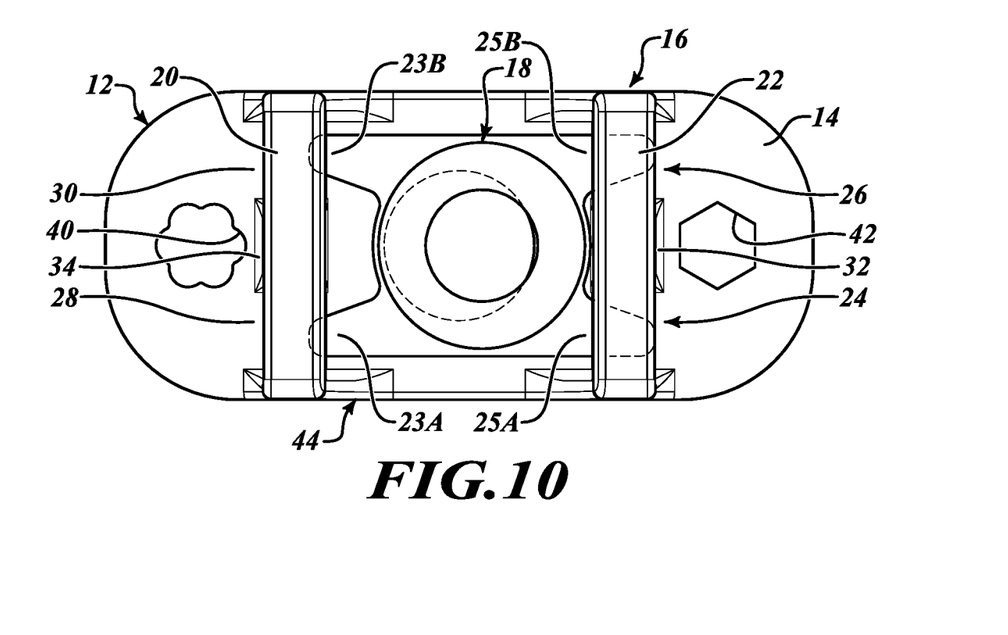
FIG. 10 Is a top view similar to FIGS. 8-9, but shows the metal nut translated slightly to the right.
Figure 11:
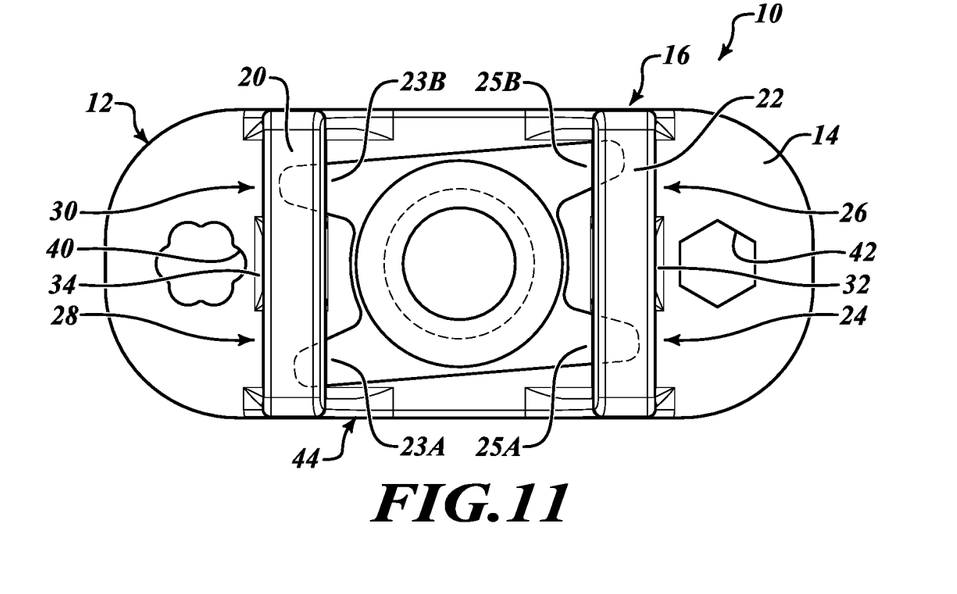
FIG. 11 is a top view similar to FIGS. 8-10, but shows how rotation of the metal nut is stopped during the course of inserting a fastener in the nut and threading and/or tightening the fastener in the nut.

Referring now to FIGS. 8-10, the size of the posts 32, 34 and the distance between nut tangs 25A, 25B, 23A, 23B are selected so that the nut 18 can float in different side-to-side directions for initial fastener insertion and subsequent threading of the fastener. The center posts 32, 34 take most of the rotational force load when a bolt is tightened within the nut 18. Fastener designs of the type disclosed here need to be able to sustain approximately 60 inch-pounds of rotational force. The PAI plastic used here is sufficiently strong, after curing, to meet this design tolerance.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. In a nut plate fastener comprising:
  a nut having a generally cylindrical nut body oriented about a central axis, the nut body defining a generally cylindrical threaded hole oriented about the central axis, the diameter of the nut body exceeding the diameter of the threaded hole, the nut body extending from a first planar face to a second planar face, the first and second planar faces being oriented perpendicularly to central axis and parallel to each other;
    the nut further comprising first, second, third, and fourth nut tangs each extending along the first planar face such that, in concert with the first planar face, each of the first, second, third, and fourth nut tangs is oriented to define one of four corners of a generally rectangular nut flange face, the nut flange face defining a longitudinal axis passing through the central axis at a point of intersection and perpendicular to the central axis and, further, a latitudinal axis passing through the central axis and the longitudinal axis at the point of intersection, the latitudinal axis being perpendicular to each of the central axis and longitudinal axis, the first and third tangs extending to define a first nut flange edge parallel to and offset from the longitudinal axis by an edge offset distance and the second and fourth tangs extending to define a second nut flange edge in opposed relation to and parallel to the first nut flange edge and offset from the longitudinal axis by the offset distance, the first and second nut tangs being symmetrically disposed relative to the longitudinal axis defining a first nut tang notch centered on the longitudinal axis and the third and fourth nut tangs being symmetrically disposed relative to the longitudinal axis and defining a second nut tang notch centered on the longitudinal axis; and
  a nut plate base formed of cured polyamide-imide resin and comprising a flat elongated base plate, the base plate having a first and a second planar base face, the first and second planar base faces being parallel to each other, the base plate defining a cylindrical plate bore having a bore axis and a bore diameter, the bore diameter being greater than the diameter of the threaded hole but lesser than the diameter of the nut body, the first planar base face further comprising a nut cage to hold the nut in contact with the nut flange face such that the threaded hole and the plate bore rest in substantial coaxially alignment, thereby to allow a bolt to pass through the plate bore to engage threads within the threaded hole, the nut cage comprising each of a first and a second nut cage bridge, the first and second nut cage bridges being oriented about the plate bore in opposed symmetric relationship and spaced apart such that each presents an inner edge is offset from the longitudinal axis by a snap distance of less than the edge offset distance which is selected to allow first, second, third and fourth tangs to flex the either of the first nut cage bridge or the second nut cage bridge sufficiently to allow the first, second, third and fourth tangs to snap into engagement in response to axial pressure that first, second, third and fourth tangs being long enough to hold the nut in engagement with the first nut cage bridge and the second nut cage bridge after such snapping, the first nut cage bridge comprising a first center post and the second nut cage bridge comprising a second center post the first center post to engage the first nut tang notch and the second center post to engage the second nut tang notch.

2. The nut plate fastener of claim 1, wherein the second planar face includes an annular ring extending from the second planar face in a direction away from the first planar face positioned to surround the plate bore.

3. The nut plate fastener of claim 1, wherein the nut base plate defines a rivet hole.

4. The nut plate fastener of claim 3, wherein the rivet hole is defined in a shape selected from a round circle, a hexagon, and a clover-shape.

5. The nut plate fastener of claim 1, wherein each of the first nut cage bridge and the second nut cage bridge further comprise a first and second legs on either side of the respective center post nut cage bridge comprises.

6. In a nut plate fastener comprising:
  a nut defining a helically-threaded cylindrical opening along a first axis, the nut having all nut walls parallel to the first axis, the nut having opposing first and second planar surfaces, the first and second planar nut surfaces being orthogonal to the first axis, the nut having four tangs in two pairs, the tangs extending along the first planar nut surface to define a generally rectangular nut flange, the generally rectangular nut flange being symmetric along both its major and minor axes which intersect the first axis at a point of intersection, the generally rectangular nut flange defines two symmetrically disposed flange notches each situated on the major axis in opposed relationship relative to the point of intersection, the notches each being located between one pair of the four tangs;
  a nut plate base, formed of cured polyamide-imide resin and comprising an electrically nonconductive base plate, the nut plate base having first and second planar base surfaces, the first planar base surface slidingly contacting the generally planar flange on the first planar nut surface, the nut plate base defining a cylindrical base through hole capable of receiving a bolt to be threadingly engaged with the helically-threaded cylindrical opening, the first planar base surface includes a pair of nut capture bridges in opposed relationship relative to the cylindrical base through hole each bridge having a central post positioned to engage a flange notch, the bridges configured, in concert, to capture the nut by overarching the pair of tangs defining one corresponding central post, the first and second bridges being spaced apart sufficiently to allow the one pair of tangs to urge the bridges apart sufficiently to pass into snapping engagement in response to pressure along the first axis and to remain in engagement in the absence of such pressure along the first axis.

7. The nut plate fastener of claim 6, wherein the second planar face includes an annular ring extending from the second planar face in a direction away from the first planar face positioned to surround the cylindrical base through hole.

8. The nut plate fastener of claim 6, wherein the polyamide-imide is Torlon™.

9. The nut plate fastener of claim 6, wherein the nut base plate defines a rivet hole.

10. The nut plate fastener of claim 1, wherein the polyamide-imide resin is Torlon™.

11. The nut plate fastener of claim 9, wherein the rivet hole is defined in a shape selected from a round circle, a hexagon, and a clover-shape.

12. A method for assembling a nut plate fastener, the method comprising:
    forming a metal nut having a generally cylindrical nut body oriented about a central axis:
        the nut body defining a generally cylindrical threaded hole oriented about the central axis, the diameter of the nut body exceeding the diameter of the threaded hole, the nut body extending from a first planar face to a second planar face, the first and second planar faces being oriented perpendicularly to central axis and parallel to each other;
        the nut further comprising first, second, third, and fourth nut tangs each extending along the first planar face such that, in concert with the first planar face, each of the first, second, third, and fourth nut tangs is oriented to define one of four corners of a generally rectangular nut flange face, the nut flange face defining a longitudinal axis passing through the central axis at a point of intersection and perpendicular to the central axis and, further, a latitudinal axis passing through the central axis and the longitudinal axis at the point of intersection, the latitudinal axis being perpendicular to each of the central axis and longitudinal axis, the first and third tangs extending to define a first nut flange edge parallel to and offset from the longitudinal axis by an edge offset distance and the second and fourth tangs extending to define a second nut flange edge in opposed relation to and parallel to the first nut flange edge and offset from the longitudinal axis by the offset distance, the first and second nut tangs being symmetrically disposed relative to the longitudinal axis defining a first nut tang notch centered on the longitudinal axis and the third and fourth nut tangs being symmetrically disposed relative to the longitudinal axis and defining a second nut tang notch centered on the longitudinal axis; and injection molding a nut plate base formed of cured polyamide-imide resin and comprising a flat elongated base plate, the base plate having a first and a second planar base face, the first and second planar base faces being parallel to each other, the base plate defining a cylindrical plate bore having a bore axis and a bore diameter, the bore diameter being greater than the diameter of the threaded hole but lesser than the diameter of the nut body, the first planar base face further comprising a nut cage to hold the nut in contact with the nut flange face such that the threaded hole and the plate bore rest in substantial coaxially alignment, thereby to allow a bolt to pass through the plate bore to engage threads within the threaded hole, the nut cage comprising each of a first and a second nut cage bridge, the first and second nut cage bridges being oriented about the plate bore in opposed symmetric relationship, the first nut cage bridge comprising a first center post and the second nut cage bridge comprising a second center post, the first center post to engage the first nut tang notch and the second center post to engage the second nut tang notch, the first and second bridges being spaced apart sufficiently to allow the one pair of tangs to urge the bridges apart sufficiently to pass into snapping engagement in response to pressure along the bore axis and to remain in engagement in the absence of such pressure along the first axis;

curing the injection molded nut plate base at a heat and for a duration selected to cure the nut plate base sufficiently to increase in molecular weight through a process of chain extension, branching and cross-linking;

flexing the nut plate base sufficiently to separate the first and second nut capture bridges to allow insertion of the metal nut snapping into a position such that when so inserted, the first center post engages the first nut tang notch and the second center post engages the second nut tang notch; and inserting the metal nut between the bridges such that the metal nut is captured in a position such that the first center post engages the first nut tang notch and the second center post engages the second nut tang notch.

13. The method for assembling a nut plate fastener of claim 12, wherein the second planar face includes an annular ring extending from the second planar face in a direction away from the first planar face positioned to surround the plate bore.

14. The method for assembling a nut plate fastener of claim 12, wherein the nut base plate defines a rivet hole.

15. The method for assembling a nut plate fastener of claim 12, wherein the rivet hole is defined in a shape selected from a round circle, a hexagon, and a clover-shape.

* * * * *